United States Patent [19]

Dautremay et al.

[11] 4,352,195

[45] Sep. 28, 1982

[54] DEVICE FOR THE SYNCHRONIZATION OF A TIMING SIGNAL

[75] Inventors: Alain Dautremay; Jean M. Boljevic, both of Paris, France

[73] Assignee: Thomson-CSF, Paris, France

[21] Appl. No.: 154,955

[22] Filed: May 30, 1980

[30] Foreign Application Priority Data

Jun. 1, 1979 [FR] France ............................... 79 14178

[51] Int. Cl.³ ............................................. H03L 7/18
[52] U.S. Cl. ..................................... 375/120; 331/25; 328/72; 328/155
[58] Field of Search ..................... 329/50, 122; 328/72, 328/155; 331/10, 25; 375/110, 120

[56] References Cited

U.S. PATENT DOCUMENTS

| | | | |
|---|---|---|---|
| 3,440,547 | 4/1969 | Houcke | 328/72 |
| 3,562,661 | 2/1971 | Crumb et al. | 331/25 |
| 3,755,748 | 8/1973 | Larlow et al. | 328/155 |
| 4,080,576 | 3/1978 | Huber et al. | 328/72 |
| 4,229,822 | 10/1980 | Bench | 375/120 |

Primary Examiner—John S. Heyman
Attorney, Agent, or Firm—Oblon, Fisher, Spivak, McClelland & Maier

[57] ABSTRACT

A device for the synchronization of a local timing signal which restores the baud rhythm at which the binary data of a message are received comprises a device for making the frequency and phase of the local timing signal dependent on the transitions of the data signal received and a rapid synchronization circuit for accelerating the synchronization process. This circuit counts the number of coincidences of n successive transitions detected (n equals a positive integer) with each of k separate time intervals (k equals positive integer) of the same duration. It divides up the integrality of each cycle of the local timing signal and supplies a pulse as from the time at which p coincidences with one of the k intervals of time have been counted. This pulse makes it possible to initiate the dependent local timing signal within a very short time.

4 Claims, 2 Drawing Figures

DEVICE FOR THE SYNCHRONIZATION OF A TIMING SIGNAL

BACKGROUND OF THE INVENTION

The present invention relates to devices for the synchronization of timing signals and in particular those equipping synchronous data transmission systems.

In general, the succession of binary data is divided up into groups of m bits (m integer ≧ 1). A signal element of duration equal to m times the bit period corresponds to each group. This signal element is chosen from two 2m possible forms. The signal elements are transmitted consecutively at a rhythm called the baud rhythm. The passage from one signal element to the next will be called hereinafter "data signal transition".

These systems make it necessary to reconstitute on reception a local timing signal restoring the baud rhythm at which the binary data of a message were transmitted. This local timing signal must be dependent in frequency and phase on the transmission timing signal, so as to give the appropriate value to the data bits on the basis of the data signal received.

A well known solution consists of detecting the transitions of the data signals and dividing the frequency of a timing signal from an oscillator supplying a frequency q times higher than the frequency of the desired local timing signal by means of a divider with a variable dividing number. The value of this variable dividing number is controlled by a control signal supplied by a detector of the position of the data signal transition relative to the rising front of a local timing signal obtained at the output of the divider in order to vary the frequency and consequently the phase of this local timing signal.

This dependence method which uses transitions of the data signal is only possible when data are present. Thus, each new appearance of data makes it necessary to have a prior acquisition period permittting a phase lead of the local timing signal, followed by a synchronization maintenance period on the transitions of the data signals, whilst said signal is present. The acquisition period involves a large number of transitions thus reducing to a minimum the time necessary for the phase lead of the local timing signal.

However, a disadvantage of this solution is caused by the difficulty of having an acquisition period which is both short and reliable. Thus, a short acquisition period when there can only be a limited number of transitions is less reliable than an acquisition sequence using a large number of transitions and permitting a better filtering.

Another disadvantage is due to the slowing down of the synchronization time when the transitions suffer from phase noise and when the starting point of the local timing signal, at the moment when the first transitions appear, is in phase opposition with that which it would have after synchronization.

Another method consists of effecting a prepositioning of the divider and using one of the first data transitions of a message. When the prepositioning has been performed, the phase dependence is maintained on the following data signal transitions.

This solution has the advantage of being very rapid, but can only be used when the quality of the transition channel is sufficient not to transmit interference pulses. However, this does not occur under practical conditions.

BRIEF SUMMARY OF THE INVENTION

The object of the invention is to obviate these disadvantages by simple means.

The present invention therefore relates to a device for the synchronization of a local timing signal with respect to a data signal, wherein it comprises: a dependence device incorporating a data signal transition detector having an output, a phase comparator for determining the position of the transitions relative to the rising front of the local timing signal and having an input coupled to the output of the detector and an output, and a local timing signal generator having in series an oscillator, a divider with a variable dividing number coupled to the oscillator and having a control input coupled to the output of the phase comparator and a fixed divider, coupled to the divider having a variable dividing number and having an initiating input and an output; a rapid synchronization circuit comprising counting means for counting the number of coincidences of n successive transitions detected (n equals positive integer) with each of k separate time intervals (k equals positive integer) of the same duration, dividing up the integrality of each local timing signal cycle and for supplying a pulse as from the time at which p coincidences with one of the k time intervals have been counted, having a signal input coupled to the output of the transition detector, an output coupled to the initiating input of the fixed divider and a counting control input coupled to the output of the fixed divider.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
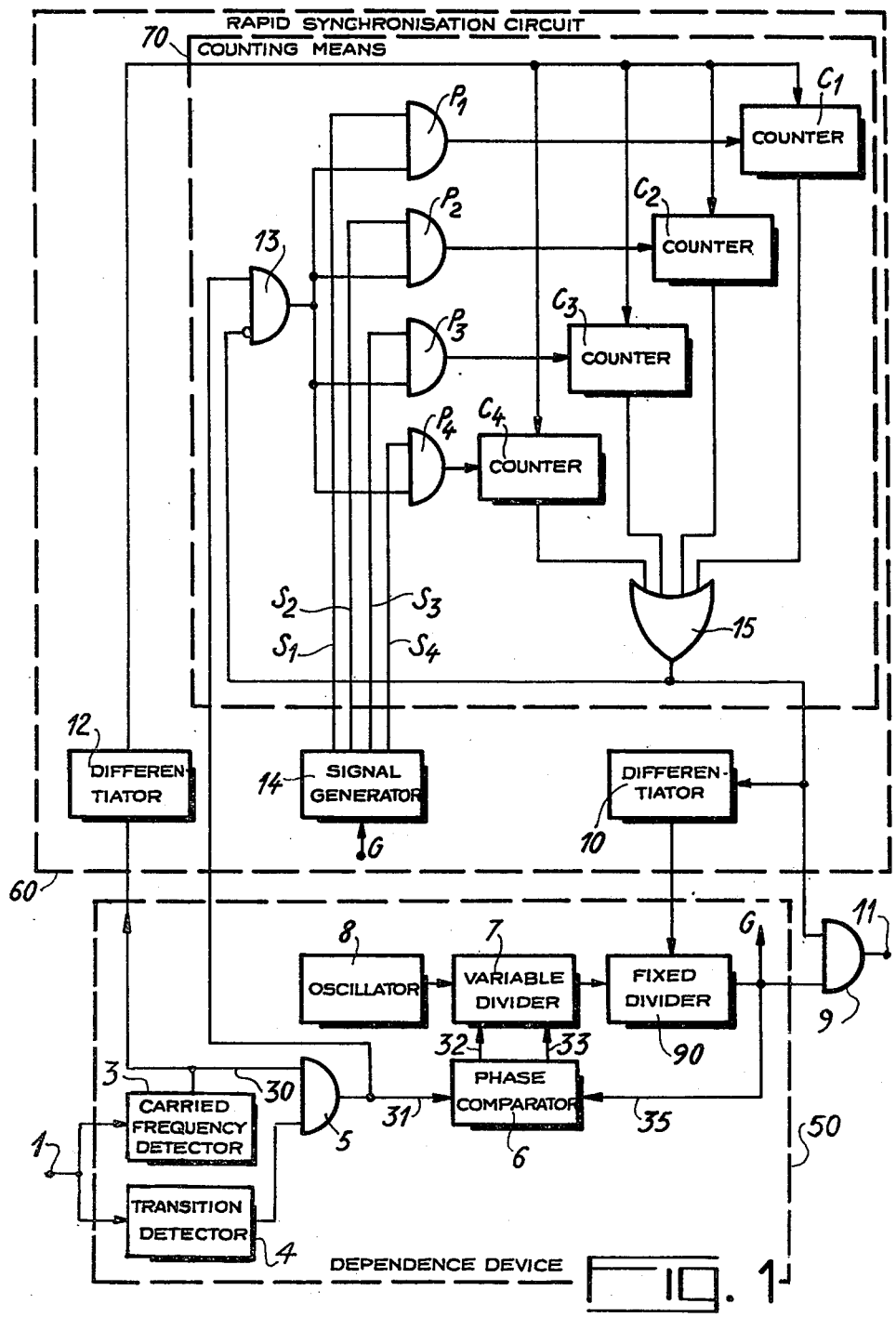
FIG. 1 is a diagram of an embodiment of a synchronization device according to the invention.

In FIG. 1, a dependence device 50 has an input terminal 1 for receiving a signal modulated by the diameter of a message and an output connected to a first input of an AND gate 9. This dependence device 50 comprises a carrier frequency detector 3 coupling terminal 1 to a first input of an AND gate 5, whose second input is coupled to terminal 1 across a transition detector 4. The output of the AND gate 5 is connected to a first input 31 of a phase comparator 6. The outputs 32 and 33 of comparator 6 are respectively connected to the first and second control inputs of a variable divider 7, which has a third input connected to an oscillator 8 and an output connected to a first input and the AND gate 9 across a fixed divider 90. The output of divider 90 is also connected to a second input 35 of phase comparator 6. The output of the AND gate 9 is connected to output terminal 11.

In the same drawing, a rapid synchronization circuit 60 comprises counting means 70 formed by an AND gate 13, four AND gates $P_i$ (i varying from 1 to 4), four counters $C_i$ and an OR gate 15. Circuit 60 also has a first differentiator 12, coupling the output of the detector 3 to each of the resetting inputs of counters $C_i$, a second differentiator 10 coupling an initiating input of the fixed divider 90 to the output of the OR gate 15, connected to a second input of the AND gate 9 and to a first complementary input of the AND gate 13. Finally, circuit 60 has a signal generator 14 having an input connected to the output of the fixed divider 90 and four outputs $S_i$. Each output $S_i$ is connected to a first input of the corresponding gate $P_i$. Each of the second inputs of gates $P_i$ is connected to the output of the AND gates 13, whose second input is connected to the output of the AND gate 5. The output of each gate $P_i$ is connected to the nth corresponding input of the OR gate 15 across the corresponding counter $C_i$.

Figure 2:
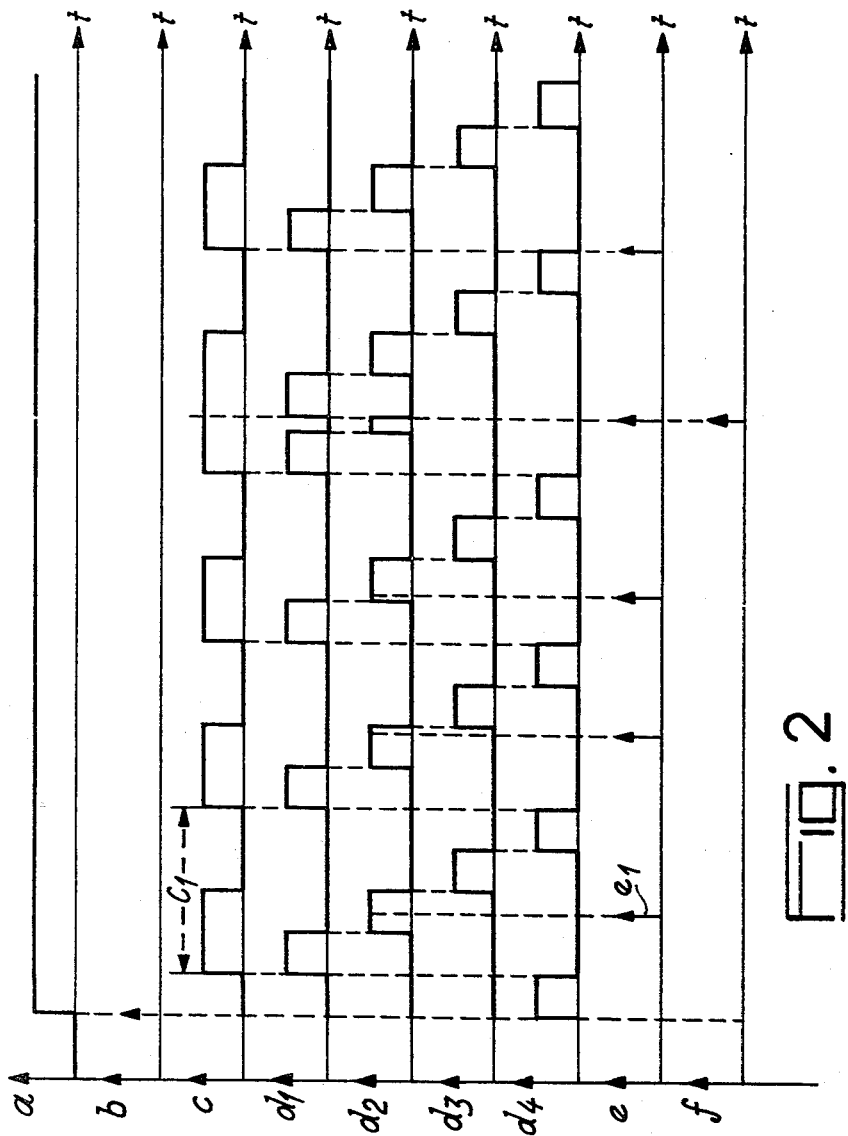
FIG. 2 is voltage-time diagrams of signals explaining the operation of the device of FIG. 1.

The operation of this synchronization device will be better understood from the voltage-time diagrams of FIG. 2.

FIG. 2 shows the signals a, b, c, $d_1$, $d_2$, $d_3$, $d_4$, e, f respectively present at the output of the carrier frequency detector 3, at the output of differentiator 12, at the output of fixed divider 90, at the output $S_i$, at the output $S_2$, at the output $S_3$, at the output $S_4$ of decoder 14, at the output of transition detector 4 and at the output of differentiator 10.

As the dependence device 50 is well known the description of its operation will be limited to what is necessary for the better understanding of the invention.

Signal A is a logic signal 1, characteristic of the presence of signals received and it opens the AND gate 5 to the data transition supplied by the transition detector 4 and represented by signal e.

In the present embodiment, the divider constituted by variable divider 7 in series with fixed divider 90 has a division rank, in the inoperative state, equal to 512. This can be raised to 511 or 513 under the action of signals respectively applied to the inputs 32 or 33 of divider 7 (at a rate of 1 per cycle of the baud rhythm). The nominal frequency of oscillator 8 is, in the present embodiment, 614.4 kHz and that of the divider 90 in the inoperative state (signal c) is 1200 Hz, which is the value of the clock timing the data received.

The phase lag $3\pi/4$ shown in FIG. 2 of the first detected transition $e_1$ relative to the rising front of the first cycle $C_1$ of signal c is measured by phase comparator 6, which the allocates to divider 7 division rank 5 on a single occasion during the baud rhythm cycle.

If the oscillator frequency is correct, the phase lead will occur at the end of $(135 \times 512)/(2 \times 180) = 192$ cycles approximately, i.e. a delay of 0.16 seconds.

However, this process will be accelerated by the rapid synchronization device 60 according to the invention. Generator 14 supplies four cyclic signals $d_1$, $d_2$, $d_3$, $d_4$ of the same frequency as signal c, but whose time is equal to quarter the cycle of said signal c, each being displaced relative to the following signal by $\pi/2$. The rising front of signal $d_1$ is displaced in phase with the rising front of signal c.

Gates $P_1$ to $P_4$ respectively only permit the passage of the transitions of signal e for the duration signals $d_1$ to $d_4$ and, in the case of coincidence, supply a logic 1 making it possible to define the position of the transitions relative to the rising front of signal c. In view of the uncertain nature of the single measurement, due to the effects of transmission noise, it is expected that four coincidences will be counted by one of the counters $C_o$ to $C_4$ to take account of the final coincidence.

In FIG. 2, it can be seen that the first transition $e_1$ (after starting up) coincides with signal $d_2$. Gate $P_2$ permits the passage of this transition and at the end of four transitions counter $C_2$ supplies a logic 1 which, across the OR gate 15, brings about the stopping of counters $C_1$ to $C_4$ and across the differentiator 10 starts up the fixed divider 90 in such a way that the next rising front of timing signal c is located in the expected proximity of the next data transition.

The counters $C_1$ and $C_4$ of the counting means are reset by a pulse obtained by differentiation of the rising front of the output signal of detector 3, corresponding to the appearance of the carrier of the data signal at terminal 1. This differentiation is carried out by differentiator 12.

The efficiency of the device described hereinbefore has been proved. Thus, a synchronization of the local timing signal has been obtained in 4 to 7 periods or cycles. The data signal contained one data signal transition per timing signal cycle and the dispersion of the data transition did not exceed quarter of said cycle.

This efficiency is maintained if the initial phase of the local timing signal is in opposition with the phase obtained after synchronization.

The invention is not limited to the described and represented embodiments.

In particular, the choice criteria for the values of the number p of coincidences for starting counters $C_i$, the number k of gates $P_i$ and counter s $C_i$, as well as the division rank q of divider 7 in the inoperative state are as follows:

The higher p, the more accurate the choice of the initiation times. However, it is necessary to have a minimum of p coincidences to bring about initiation, whereby p must be sufficiently small to synchronize the local timing signal in a short time.

The accuracy of the phase synchronization increases with the size of k, the duration of a signal $d_i$ being inversely proportional to k. However, for cost reasons, k must be limited.

In order to obtain a well filtered local timing signal, it is necessary to give q a high value. The only limitation as regards too high values is due to the necessity of compensating the relative displacement of the oscillators used on transition and reception.

In the embodiment described, signal generator 14 is such that it breaks down a local timing signal cycle into k time intervals of equal duration to within the correction stage T/q affecting the k interval (T: cycle of the desired local timing signal). This influence, which is limited if q is high compared with k and p, can be eliminated by keeping the variable divider on a fixed division rank q before initiation.

The control signals $d_i$ were obtained at the output of signal generator 14, but it falls within the activity of the Expert to obtain the signals from division ranks of divider 90.

What is claimed is:

1. A device for the synchronization of a local timing signal with respect to a data signal, wherein it comprises: a dependence device incorporating a data signal transition detector having an output, a phase comparator for determining the position of the transitions relative to the rising front of the local timing signal and having an input coupled to the output of the detector and an output, and a local timing signal generator having in series an oscillator, a divider with a variable dividing number coupled to the oscillator and having a control input coupled to the output of the phase comparator, and a fixed divider, coupled to the divider having a variable dividing number and having an initiating input and an output, a rapid synchronization circuit comprising counting means for counting the number of coincidences of n successive transitions detected (n equals positive integer) with each of k separate time intervals (k equals positive integer) of the same duration, dividing up the integrality of each local timing signal cycle and for supplying a pulse as from the time at which p coincidences with one of the k time intervals have been counted, having a signal input coupled to the output of the transition detector, an output coupled to the initiating input of the fixed divider and a counting control input coupled to the output of the fixed divider.

2. A synchronization device according to claim 1, wherein the counting means comprise an OR gate, k counters, each having an output coupled to the output of a counting means across the OR gate and each having an input, and control means respectively coupling each of the k inputs of the counters to the signal input during one of the k time intervals, each of the k counters being incremented wherever data signal transition is present at its input.

3. A synchronization device according to claim 2, wherein the control means comprise k AND gates, each having a first input coupled to the signal input, a second input and an output, a signal generator having an input coupled to the output of the fixed divider and k outputs respectively coupled to k second inputs of the k AND gates, the k outputs of the k AND gates being respectively coupled to the k inputs of the k counters.

4. A synchronization device according to claims 2 or 3, comprising an output, a data signal detector having an output, a first supplementary AND gate having a first input coupled to the output of the counting means, a second input coupled to the output of the fixed divider and an output coupled to the output of the synchronization device, a second supplementary AND gate having a first input, a second input coupled to the output of the transition detector and an output coupled to the signal input of the counting means and to the input of the phase comparator, a differentiating circuit, and wherein the k counters incorporate a resetting input coupled across the differentiating circuit to the first input of the second supplementary AND gate and to the output of the data signal detector.

* * * * *